April 23, 1968     G. T. WELTON     3,379,022
UNDERWATER SHELTER
Filed Dec. 1, 1964
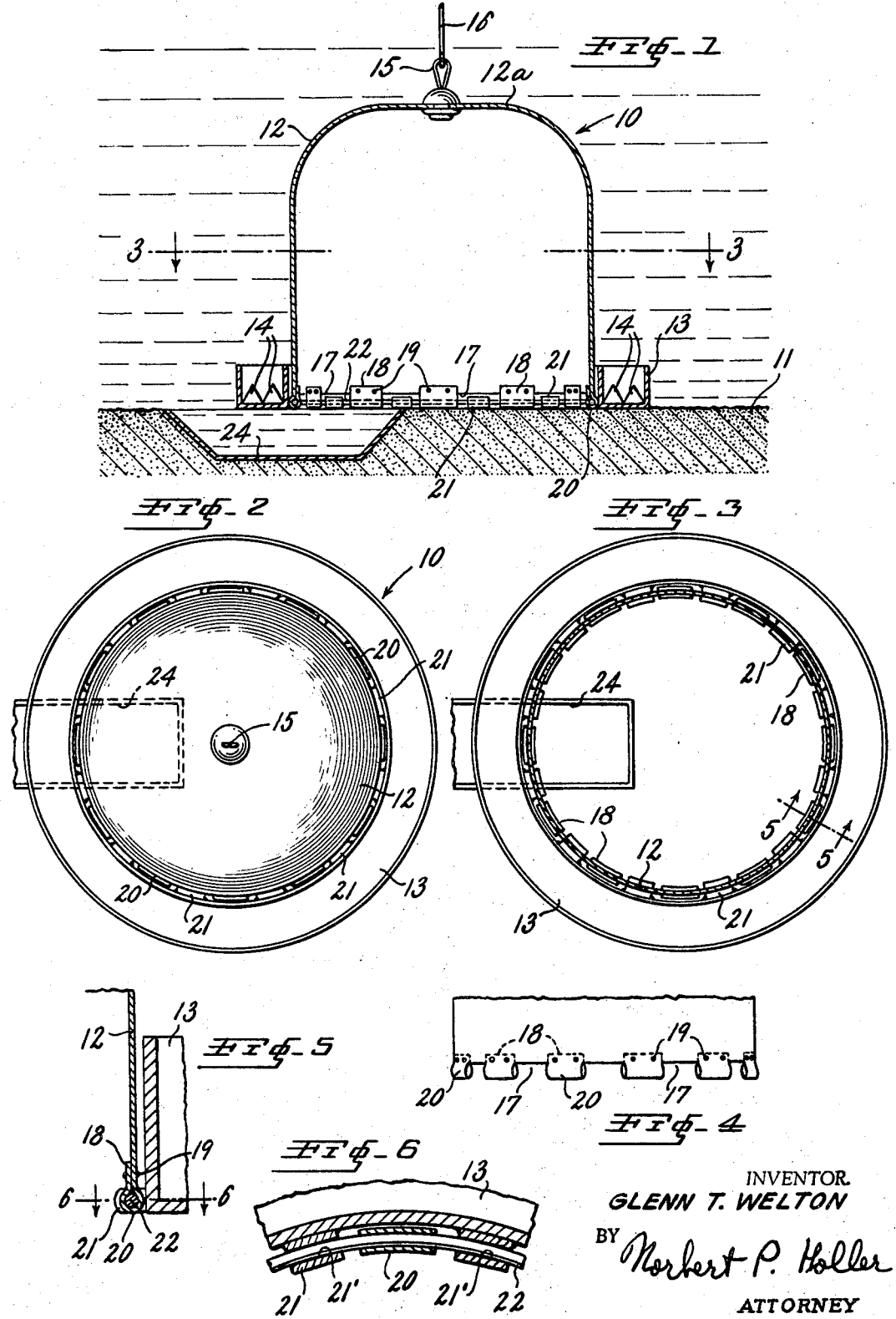
INVENTOR.
GLENN T. WELTON
BY Norbert P. Holler
ATTORNEY ns
UNDERWATER SHELTER Glenn T. Welton, Arlington, Va., assignor to
Uniroyal, Inc., a corporation of New Jersey
Filed Dec. 1, 1964, Ser. No. 415,066
4 Claims. (Cl. 61—69)

This invention relates to inflatable shelters or work sheds suited for use in underwater exploration, repairs, salvage, rescue and other tasks of a similar nature.

Underwater work of any type which must be performed by human beings is generally limited in scope by the fact that divers equipped with conventional diving gear cannot remain or work efficiently for extended periods of time under the adverse pressure conditions existing at relatively great depths, for example on the ocean floor. Except for such pressurized rigid vessels as submarines and bathyspheres, however, no means have been available prior to the present invention for enabling divers to move about freely in air directly on the bottom of any deep body of water and to remain there for an extended period of time.

It is an important object of the present invention, therefore, to provide a novel type of underwater shelter.

It is another object of the present invention to provide such an underwater shelter in which divers can move about in air without being encumbered by conventional diving gear and unhindered by the surrounding mass of water.

Still another object of the present invention is the provision of an underwater shelter as aforesaid which can be utilized advantageously at relatively shallow depths as well as at relatively great depths and either at the bottom or at any other desired level between the surface of the water and the bottom thereof.

A more specific object of the present invention is the provision of such an underwater shelter the main body of which is composed of a flexible air and water-impervious material so as to be inflatable for use and collapsible when not in use, and is associated with ballast means enabling the shelter to be lowered and securely retained below the water surface even when inflated.

The foregoing and other objects, characteristics and advantages of the present invention will be more clearly understood from the following detailed description thereof when read in conjunction with the accompanying drawing, in which:

FIG. 1 is a vertical sectional view of an underwater shelter constructed in accordance with the present invention and shows the same inflated and on the bottom of a body of water;

FIG. 2 is a top plan view of the shelter shown in FIG. 1;

FIG. 3 is a sectional view taken along the line 3—3 in FIG. 1;

FIG. 4 is a fragmentary elevational view of the bottom edge of the flexible main body of the underwater shelter according to the present invention disassembled from the ballast means;

FIG. 5 is a sectional view taken along the line 5—5 in FIG. 3; and

FIG. 6 is a sectional view taken along the line 6—6 in FIG. 5.

Referring now to the drawing in greater detail, it will be seen that in accordance with a preferred aspect of the present invention, an underwater shelter 10, shown in FIG. 1 as positioned on the bottom 11 of a body of water and in an inflated condition, comprises a main body 12 of essentially circular cross-section which is closed by a top wall 12a and open at the bottom, and an annular or circular channel-shaped ballast receptacle 13 which is attached, in a manner still to be described, to the bottom end region of the body 12 and contains a plurality of ballast members 14 (not illustrated in FIGS. 2 and 3), for example lead weights. Affixed to the top wall 12a of the body of the shelter is a loop or eye 15 to enable a cable 16 to be attached to the shelter for lowering or raising the same.

The shelter body 12 when inflated preferably has the generally cylindrical shape illustrated in FIG. 1 and may be between about 5 and 50 feet or more in diameter and between about 6 and 25 feet or more in height. Most advantageously, the body 12 is formed of a plurality of plies of rubberized cord fabric, i.e. of a fabric made of cords composed of cotton, rayon, nylon or other textile fibers and filaments, coated with suitably thick layers of a rubbery material, e.g. natural rubber, synthetic rubber, and the like, which when cured will be immune to attack by the water (and/or the mineral components thereof) in which the shelter is used and also will be completely impervious to air and water and capable of withstanding the lowest possible temperatures to be encountered at the maximum intended depth of installation of the shelter. The manner of manufacture of the body 12 is conveniently as described in U.S. Patent No. 2,612,924. Merely by way of example, a shelter employing a body made of four plies of standard rayon tire cord fabric coated with neoprene and having, when finally shaped and cured, a wall thickness of 0.212 inch has been found suited for use at depths of up to 1000 feet of sea water. The wall thickness will, of course, generally depend on the number of plies employed.

The manner of attachment of the ballast receptacle or crib 13 to the lowermost edge of the shelter body 12 is best illustrated in FIGS. 1 and 4 to 6. As clearly shown in FIG. 4, the bottom edge region of the body 12 is cut away at a plurality of peripherally spaced locations, indicated at 17, thereby defining a plurality of essentially rectangular flaps 18. The latter are turned up along the inner surface of the body 12 and are secured thereto, by vulcanizing and/or by means of rivets or other fasteners 19, so as to define a plurality of axially aligned loops 20. Correspondingly, the ballast crib 13 on its radially innermost outer surface is provided with a plurality of spaced lugs or ears 21 which are rigidly affixed thereto, as by welding, and are provided with a plurality of interior bores or passageways 21'. The actual attachment of the body 12 to the ballast crib 13 is effected by means of a cable or wire 22 passing through the alternating ears 21 of the ballast crib and loops 20 of the shelter body 12.

It will be clear to those skilled in the art that in lieu of a cable and ear arrangement as set forth, the means for securing the shelter body 12 to the ballast crib 13 may comprise a rigid rod or rail fixedly connected to the crib through the intermediary of a plurality of spaced arms. The connection is then effected by looping the flaps 18 through the spaces between these arms and abut the associated portions of the rail and then vulcanizing or otherwise securing the flaps to the inner surface of the body 12 as stated.

In use, the shelter 10 is generally readied for occupancy by being inflated with air to a pressure equal to the expected water pressure which will be encountered at the depth where the work is to be done. It will be understood that for the purpose of inflation, the shelter must be submerged either fully or at least partly and weighed down by as much ballast 14 as is necessary to offset the weight of the water to be displaced by the fully inflated shelter when submerged to its working location. Accordingly, the shelter may be inflated at the surface (with only the ballast crib submerged) and then lowered to its operating depth, during which descent the air will keep all water out. Alternatively, the shelter may be lowered to its working depth while in a completely collapsed condition and then inflated in situ. As another alternative, the shelter may be permitted to fill with water, and air would be pumped in to expel this water once the shelter has reached its working depth. The first and third of these alternative procedures may, of course, be carried out also while the shelter is in the progress of its descent. It will be apparent that the inflation may be carried out with the air line (not shown) communicating with the shelter body either through a suitable fitting (not shown) arranged in the top wall 12a, for example, or by being looped about the bottom of the ballast crib 13.

As clearly shown in FIGS. 1 to 3, when the shelter 10 is located on the bottom of a body of water, with the ballast crib now also constituting the ground-engaging support for the shelter, access thereto, is generally provided by a dug out trench or passageway lined with a silt movement-inhibiting metal trough 24 or the like passing beneath one part of the ballast crib 13 and essentially radially thereof. It should be appreciated, however, that the shelter 10 need not be located on the bottom 11 but may be disposed at any desired elevation between the bottom and the surface of the water. In such a case, however, it will be advantageous to provide an anchor for immobilizing the shelter at its prescribed location.

From the foregoing it will be understood that I have provided a novel shelter or work shed which is light in weight, collapsible, non-rusting and essentially self-insulating, and the proper use of which, in implementation of the principles of the present invention, makes it possible for the first time for divers to work and even eat and sleep in air and thus in dry surroundings, even though deep underwater, without the need for wearing "hard-hat" diving helmets or other types of breathing devices, despite the fact that the shelter is open to the water. The atmosphere for breathing can be efficaciously provided by continuously feeding a fresh mixture of air and an inert gas such as helium in desired proportions and at a specified rate into the shelter, for example from steel tanks located either on the bottom 11 adjacent the shelter or top side on a ship or other structure such as a Texas tower.

While I have described and shown herein a preferred embodiment of the present invention, I deem it understood that this disclosure is for purposes of illustration only, and that the invention is susceptible to a number of variations and modifications none of which involves any departure from the spirit and scope of the invention.

Having thus described the invention, what I claim and desire to protect by Letters Patent is:

1. An underwater shelter for enabling human beings to be housed, move about, and perform various activities in an atmosphere of air and in a dry state without the use of diving suits, helmets and associated equipment even though submerged far below the surface of the water, comprising a body made of flexible sheet material impervious to both air and water and adapted to be inflated to assume a housing-like shape having a closed top and a substantially full-width open bottom defining the access to and egress from the interior of the shelter, and ballast means secured peripherally to said body at the bottom end region thereof for weighting the shelter to counteract the buoyancy thereof when inflated and for providing ground-engaging support means for the shelter when the same is lowered to the bottom of a body of water.

2. An underwater shelter for enabling human beings to be housed, move about, and perform various activties in an atmosphere of air and in a dry state without the use of diving suits, helmets and associated equipment even though submerged far below the surface of the water, comprising a collapsible and inflatable body made of flexible sheet material composed of a plurality of piles of of rubber-coated cord fabric cured to be impervious to both air and water and shaped to assume, when inflated, a housing-like configuration having a closed top and a substantially full-width open bottom defining the access to and egress from the interior of the shelter, and ballast means secured peripherally to said body at the bottom end region thereof for weighting the shelter to counteract the buoyancy thereof when inflated and for providing ground-engaging support means for the shelter when the same is lowered to the bottom of a body of water.

3. A shelter according to claim 2, said body being of essentially cylindrical configuration when inflated, and said ballast means comprising an annular weighted receptacle surrounding the exterior of said bottom end region of said body.

4. A shelter according to claim 3, said receptacle being adapted to receive removable weights in amounts predetermined in accordance with the intended depth at which the shelter is to be positioned.

References Cited

UNITED STATES PATENTS

| | | | |
|---|---|---|---|
| 3,299,645 | 1/1967 | Link | 61—69 |
| 617,675 | 1/1899 | Crawford | 61—70 |
| 2,526,719 | 10/1950 | Winzen | 244—31 |
| 2,728,540 | 12/1955 | Ebneter | 244—31 X |
| 2,679,224 | 5/1954 | Sturtevant | 244—31 X |
| 2,950,882 | 8/1960 | Yost | 244—31 |

FOREIGN PATENTS 268,596  4/1927  Great Britain.

EARL J. WITMER, *Primary Examiner.*

UNITED STATES PATENT OFFICE
CERTIFICATE OF CORRECTION

Patent No. 3,379,022                 April 23, 1968

Glenn T. Welton

It is certified that error appears in the above identified patent and that said Letters Patent are hereby corrected as shown below:

Column 4, line 14, "activties" should read -- activities --: line 19, "piles" should read -- plies --; line 20, cancel "of".

Signed and sealed this 7th day of October 1969.

(SEAL)
Attest:

Edward M. Fletcher, Jr.

Attesting Officer

WILLIAM E. SCHUYLER, JR.

Commissioner of Patents